Dec. 16, 1958 L. N. YOHE 2,864,595
APPARATUS FOR FREEZING DESSERTS
Original Filed Nov. 13, 1950 3 Sheets-Sheet 1

INVENTOR.
LESTER N. YOHE
BY
Lancaster, Allwine & Rommel
his Attorneys

Dec. 16, 1958 L. N. YOHE 2,864,595
APPARATUS FOR FREEZING DESSERTS
Original Filed Nov. 13, 1950 3 Sheets-Sheet 2
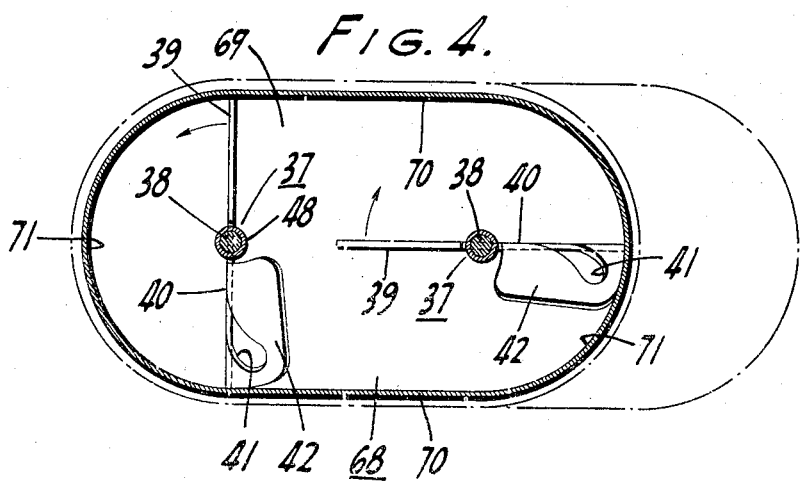
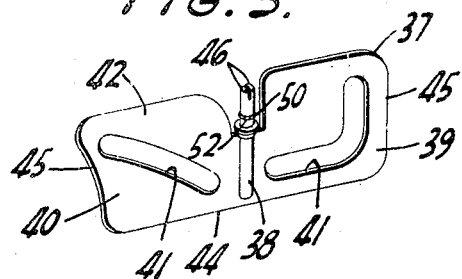
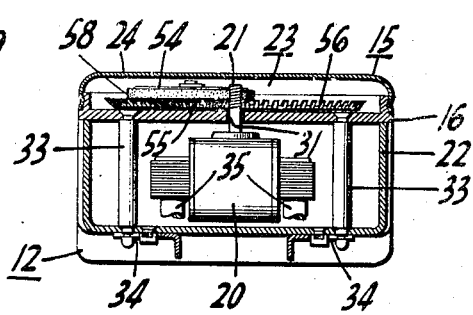
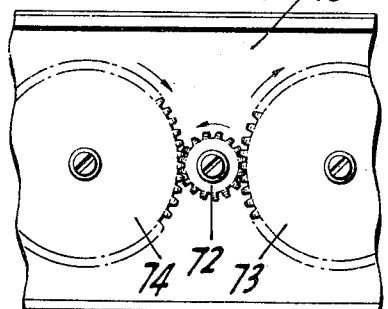
INVENTOR.
LESTER N. YOHE
BY
Lancaster, Allwine & Rommel
his Attorneys

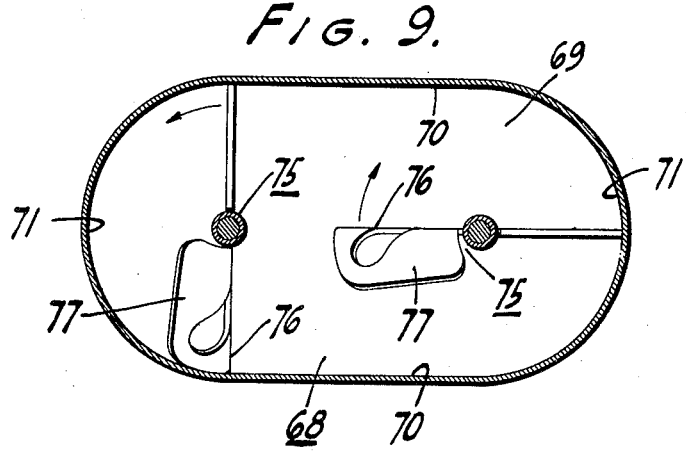
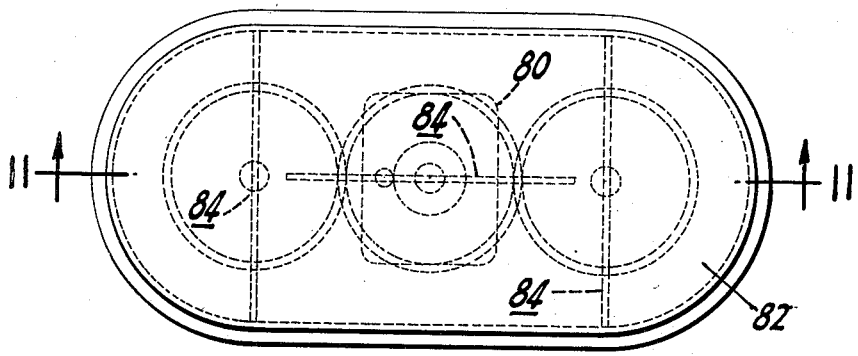
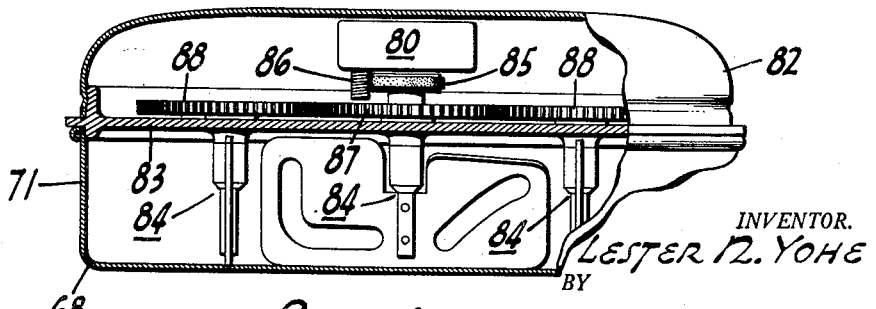

United States Patent Office 2,864,595
Patented Dec. 16, 1958

2,864,595

APPARATUS FOR FREEZING DESSERTS

Lester N. Yohe, Havertown, Pa., assignor, by mesne assignments, to The Silex Company, a corporation of Pennsylvania Continuation of abandoned application Serial No. 149,241, March 13, 1950. This application December 24, 1953, Serial No. 400,177

2 Claims. (Cl. 259—119)

This invention relates to apparatus for freezing desserts such as ice cream and other frozen delicacies in mechanically cooled refrigerators of the types embodying evaporators adapted to receive trays primarily intended for the freezing of water.

This application is a continuation of the application of Lester N. Yohe, Serial No. 149,241, filed March 13, 1950, now abandoned.

The principal objects of the invention are to provide apparatus whereby rapid transfer of heat from the freezer body to the evaporator is obtained, and whereby good frozen desserts may be produced from inexpensive ingredients; to provide agitators capable of effectively aerating the mix while freezing takes place; to provide a construction that is practical from a manufacturing standpoint; and to provide apparatus which is sanitary and easily cleaned.

Another object is to provide apparatus comprising a tray, like or similar to those usually provided for the production of ice cubes or storing frozen foods, and a lid unit detachable with respect to the trays comprising a motor, preferably an electric motor, a lid for the tray, agitating means carried by the lid and motion transmitting means operatively connecting the motor and agitators encased mainly in the lid. By this arrangement, the separate unit may be used successively with any number of trays for the production of quantities of dessert greater than the capacity of any one tray, and may be stored in the refrigerator or placed therein for cooling in advance of its being brought into use so as to reduce the period of time required to complete the freezing operation, as compared with those types of apparatus having separate or conventional lids, separate agitators requiring bearings carried by or forming parts of the trays, or motors and/or agitators fixed to the trays.

A further object is to provide apparatus including agitating means constructed and arranged to impart a spooning effect to the mix acted upon to produce an over-run of the desired characteristic either considerable over-run by spooning upwardly whereby a fluffy dessert is produced or less over-run by spooning downwardly whereby a firm dessert is produced. This may be accomplished either by selection of the direction of rotation imparted to the agitating means, as by use of a reversible motor or reverse gearing, by the provision of two types of agitating means from which selection may be made for operation to attain the desired results, or by agitating means capable of end-for-end interchangeable connection with motion transmitting means.

Other objects and advantages will appear in the following detailed description of various forms of practical embodiments of the invention, taken in connection with the accompanying drawings, forming a part of this specification, and in which drawings:

Fig. 4 is a view in horizontal section through a modified form of tray, the dot and dash lines disclosing the relationship of the lid unit to the tray.

Fig. 5 is a perspective view of one of the agitators.

Fig. 6 is a cross sectional view on substantially the line 6—6 of Fig. 2.

Fig. 7 is an enlarged sectional view on substantially the line 7—7 of Fig. 2.

Fig. 8 is a fragmentary view in plan showing a modification of the motion transmitting means for imparting motion to the agitators in the same direction.

Fig. 9 is a plan view, similar to Fig. 4 but wherein the positions of the two agitating means have been changed end for end from that shown in Fig. 4 when it is desired to provide a dessert which does not have as much over-run as that produced by the agitators positioned as in Fig. 4.

Fig. 10 is a plan view showing the motor mounted on top of the tray lid and using three agitating means.

Fig. 11 is a fragmentary sectional view on substantially the line 11—11 of Fig. 10.

Figure 1:
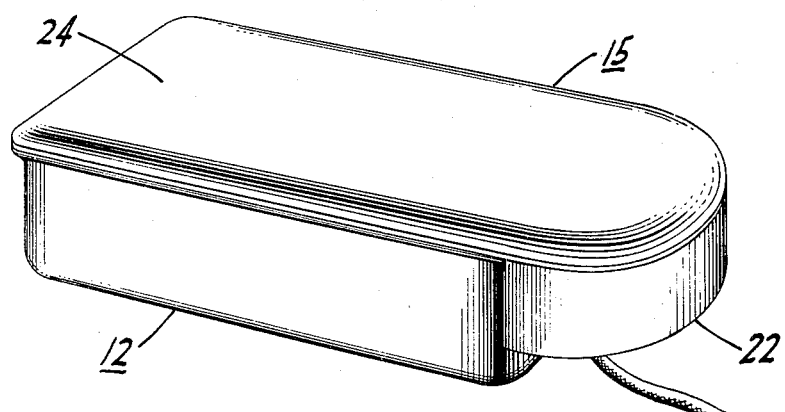
Fig. 1 is a perspective view of one embodiment of my invention.
Figure 2:
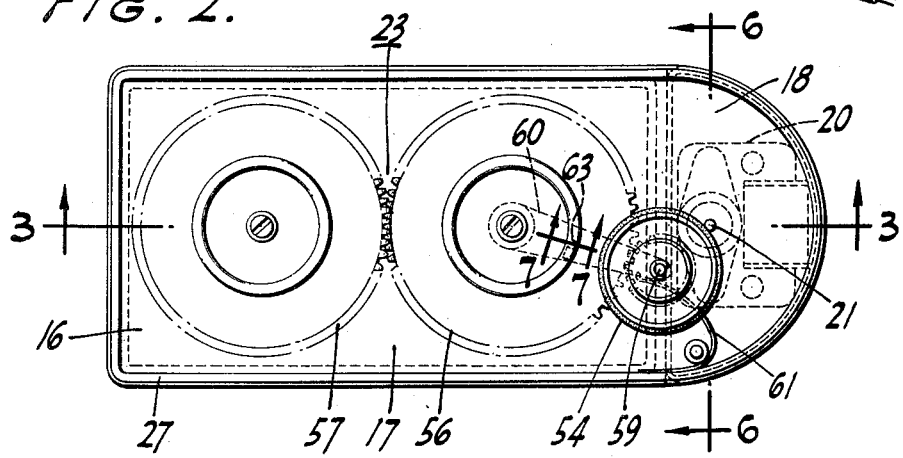
Fig. 2 is a plan view of the freezer with a mechanism cover of the lid unit removed to disclose details of motion transmitting means for imparting motion to two agitating means in the counter direction.
Figure 3:
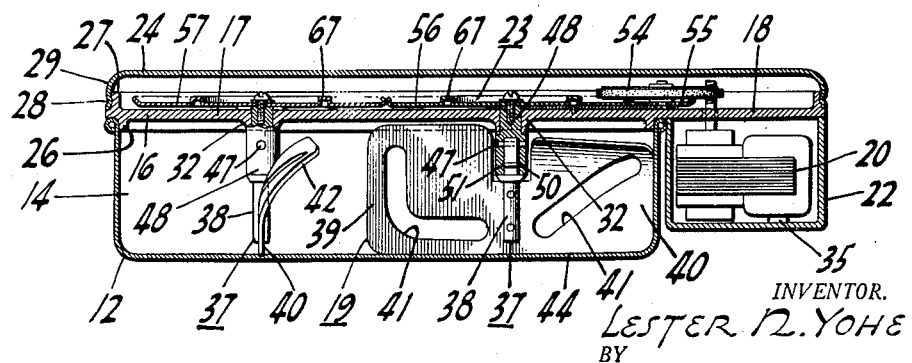
Fig. 3 is a view partly in vertical longitudinal section through the assembly shown in Fig. 1, and partly in elevation of parts within the tray chamber, lid unit and motor housing, on substantially the line 3—3 of Fig. 2.

In the drawings, and referring more particularly to Figs. 1, 2 and 3, there is provided an elongated shallow tray 12, like or similar to an ordinary ice cube tray, providing an upwardly opening chamber 14 to contain the edible mix, and a detachable unit 15 serving, among other things, as a closure for the chamber. The tray may be a conventional double depth ice cube tray and requires no special fabricating or additions, as in the case where agitating mechanisms or motion transmitting means are designed to be directly supported by the trays. Thus the trays, with which the present invention may be used, can be those which the householder has in use or those readily available at outlets for manufacturers of standard mechanical refrigerator parts or accessories.

The unit 15 preferably comprises an elongated, relatively flat elongated lid body 16, which may be cast of metal, and comprising a major portion 17 to rest upon the tray 12, and overlie and close the chamber 14, and a minor portion 18 exteriorly above and beyond one end of the tray as shown in Figs. 2 and 3; mixing means 19 carried by the lid body and disposed in the chamber 14; a motor 20, such as an electric motor, including a drive shaft 21; a housing 22 for the motor detachably connected to the minor portion 18; motion transmitting means 23 operatively connecting the motor, and particularly its drive shaft, with the mixing means 19 for operation thereof by the motor; and a cover 24 secured to the lid body 16 for protecting the major portion of the motion transmitting means.

The lid body 16 may be provided with a depending flange 26 set in a short distance from the margins of the major portion of the lid body and across the body at the juncture between the major and minor portions 17 and 18 thereof, the flange 26 to telescope into the tray, as shown in Fig. 3 to restrain longitudinal and transverse shifting of the unit 15 on the tray. As suitable means for securing the cover 24 to body 16, the latter may be provided with an upstanding flange 27 bordering the adjacent margins of portions 17 and 18 the outer face of the flange 23 being grooved to receive a bead or indentation 28 of a marginal depending flange 29 of the cover. The minor portion 18 is provided with an opening 31, shown in Fig. 6, through which the drive shaft 21 extends and suitable bearings 32 cast integral with the lid body, or otherwise provided, with vertical axes of the bearings spaced apart longitudinally of the elongated lid body 16. The minor portion 18 may also have secured thereto depending supports 33 the lower ends of which pass through openings in the bottom of housing 22, the latter being provided with detachable fastening devices 34 engaging the free ends of supports 33 as shown in Fig. 6. The motor 20 may be secured to housing 22, by standards 35 as shown in Figs. 2 and 3.

The mixing means 19 is an important characteristic of the invention and comprises a plurality of agitating means 37, 37, each preferably comprising a vertical shaft 38 and a plurality of substantially rectangular, generally upright, paddle-like wings, two of which are shown in the present example, designated 39 and 40, each extending laterally of the axes of its respective shaft. These wings are provided with openings 41 of any suitable shape to permit some of the edible material to pass therethrough to aid in thorough mixing. These openings are made sufficiently large to allow parts of fruit and nuts to pass therethrough when such are in the mix, and thus prevent clogging of the openings.

One or more of the wings of each agitating means 36—37 may be provided with means 42 to produce the spooning effect herein referred to. In the example shown, the means 36, which may be designated as a first means, has its wing 40 provided with a camber, preferably along its entire upper marginal portion, constituting the means 42. The effect of this means 42 is to entrain air in the fluid mix and produce the desired over-run in the frozen dessert, by this spooning effect as the agitating means 36 is rotated. If it is rotated in one direction so that the camber leads in the direction of rotation, such as counterclockwise as shown by arrow at the left of Fig. 4, the fluid mix is spooned or caused to flow downwardly and this provides a slightly less over-run or a firmer dessert than when agitating means 36 rotates in the opposite direction, so that the camber trails in the direction of rotation, such as clockwise as shown by arrows to the right of Fig. 9, and produces a fluffy dessert.

Likewise, in the example shown, means 37, which may be designated as second means, has its wing 40 provided with a camber, preferably along its entire upper marginal portion constituting the means 42 but the camber is in the opposite direction as shown in Figs. 3, 4 and 9 from the camber of wing 40 of agitating means 36. As a result, when the means 37 is rotated in a direction counter to the direction of rotation of means 36, as indicated by arrow near the central portion of Fig. 4, where the camber 42 of means 37 leads in the direction of rotation the fluid mix is spooned or caused to flow downwardly and produces a firm dessert. However if the agitating means 37 is rotated in the opposite direction as shown by the arrow at the left of Fig. 9, where the camber trails in the direction of rotation, a greater over-run or fluffy dessert is produced.

Each of the wings 39—40 may be made of a size so as to have its lower margin 44 in light contact with or in closely spaced or sweeping relation to the bottom of the tray, and a lateral free upright margin 45 similarly related to the side wall and adjacent end wall of the tray so as to guard against the formation of undesirable crystals next adjacent to the bottom and sides. While in this arrangement there is only that which may technically be termed as "line contact" of the agitators with the sides of the tray, mix in the zones not traversed by the agitators does not readily crystallize because of viscosity of the mix and the burbling of the agitated mix. The upper end portion of shaft 38 may be notched to provide tines 46 embracing a cross pin 47 carried by a socketed drive stud or coupling 48 rotatable in its companion bearing 32, the stud or coupling 48 forming a part of motion transmitting means 23. There may also be provided suitable latch means of the type incorporated in the stem and drive parts of ordinary food mixers, and in the example shown, the latch means comprises a divided spring washer 50 accommodated in companion circumferential grooves 51 formed in the socket of stud or coupling 48 and shaft 38, respectively, when the agitating means 36—37 is properly secured to the motion transmitting means. A pull exerted upon the agitator, axially of the shaft 38 causes the spring washer 50 to contract and free itself from the stud 48 for removal of the agitating means from the motion transmitting means, and a pushing of the agitating means in a counterdirection results in coupling relationship.

It is preferred to dispose the agitating means 36—37 so that orbits of motion of the wings thereof intersect, or in other words, so that in operation the wings of adjacent agitating means 36—37 intermesh in a manner somewhat similar to the meshing of the teeth of a gear wheel, except that in the present example the wings do not contact with one another. By this arrangement, and as shown in Figs. 4 and 9, and more particularly by dotted lines in Fig. 10, there may be but very small zones in the chamber 14 in which the wings of the agitating means 36—37 do not move, and even then when the apparatus is operating, the viscosity and burbling above referred to does not permit undesirable crystallization of the mix.

The motion transmitting means 23 is for imparting movement from the drive shaft 21 to the agitating means 36—37 in counter directions, and in the example shown, includes, in addition to the socketed drive studs or couplings 48, a train or series of engaging or cooperating wheels 54, 55, 56 and 57 for imparting movement of the motor drive shaft 21 to the drive studs or couplings 48. These wheels are arranged in a very compact manner so as to extend generally in a direction longitudinally of the lid body 16 and movable in planes parallel to the plane of the lid body as shown in Figs. 2 and 3. More specifically, in the example shown, the wheel 54 is a take-off wheel provided with a peripheral facing 58 of friction material, such as rubber for engagement with the circumferential face of shaft 21. The wheel 54 has secured to it a concentric wheel 55 which may be a pinion for engagement with the gear wheel 56 to which the socketed drive stud or coupling 48, of one of the agitating means is secured. The gear wheel 56 engages the gear wheel 57, which is in turn secured to the other socketed drive stud or coupling 48 of the other agitating means. The means 56 and 57 may be punched gears and interchangeable. The wheels 54 and 56 are preferably mounted on an upstanding stud 59 on the free end of a lever 60, being acted upon by a U-shaped spring 61 having one end portion anchored to the lid body 16 and the other end portion engaging one side of the lever so as to spring bias the take-off wheel 54 into frictional engagement with the drive shaft 21. The lever 60 may be provided with a slot 63 extending transversally thereof for receiving the shank of a hold-down shouldered cap screw 64 screwed into a threaded socket 65 in the lid body 16, as shown in Fig. 7. This arrangement of slot and screw limits the amplitude of swinging movement of the lever, so it will not be moved to a position where it would be difficult to reassemble the motor shaft 21 in proper relation to the take-off wheel 54 when the motor and its housing have been taken off the lid body, as for cleaning or repairs, and it is desired to replace same. The cap screw 64 also resists movement of the lever out of its plane of action if a force is brought upon its free end, as by the end of the motor shaft engaging it during assembly. The lever 60 may be made of relatively thin metal for compactness. The punched gear wheels 56 and 57 are shown provided each with a concentric groove 67 open to the bottom of the gear for accommodation of the head of screw 64 when the gear wheel is located above the lever 60.

In Figs. 4 and 9 a modified type of elongated tray 68 is shown, providing an upwardly opening chamber 69 defined by a uniformly flat bottom 75 longitudinally extending parallel side walls 70 and arcuate end walls 71 joined to the ends of the side walls. This type of tray is particularly efficient in that the agitating means 37 in the chamber are revoluble about vertical axes in spaced apart relation longitudinally of the tray and each has its axis concentric with its adjacent arcuate wall 71. This modified form of tray may well be manufactured for use when it is desired to purchase complete apparatus and not depend upon using conventional ice cube trays, with a detachable unit 15 such as shown in Figs. 1–3.

In Fig. 8 is shown a modified form of motion transmitting means for use with the motor shaft and agitating means. In this modification a small wheel or pinion 72 is interposed between gear wheels 73 and 74, corresponding to wheels 56 and 57, respectively, carrying the socketed drive studs or couplings 48 of the agitating means. As a result the agitating means may be driven in the same direction as indicated by the arrows in Fig. 8 instead of in counter directions, as indicated by arrows in Fig. 4.

For use in a relatively large compartment of an evaporator or in a frozen food compartment of a mechanically cooled refrigerator it may be desirable to arrange the detachable unit for the tray, so that the motor has different relationship to the lid body and to provide a series of agitating means instead of a pair as previously described. In Figs. 10 and 11 is shown such a modification in which a motor 80 is carried in a detachable unit, comprising an elongated cover 82 mounted upon an elongated lid body 83 in a manner similar to mounting of cover 24 on lid body 16, and to provide three agitating means 84, in the chamber of the tray 68 previously described. In this modified form of detachable unit, although the agitating means are revoluble about vertical axes in spaced apart relation longitudinally of the tray, as in the other forms, the central agitating means is operated by a take-off wheel 85 actuated by a depending drive shaft 86 of the motor and by use of an intermediate wheel 87 motion is imparted to the other two or end agitating means by wheels 88.

From the foregoing it is clear that the principle of the invention may be carried out in many ways, without restriction to a specific number of agitating means in the chamber of the tray, the specific location of the motor or specific details of the motion transmitting means for imparting movement of the motor to the agitating means. One form is particularly useful with conventional ice-cube trays and for use in the evaporators of ordinary domestic refrigerators using such trays. Another form is of a highly efficient character requiring a special tray but still useful in the evaporator of ordinary domestic refrigerators. Still another form, also highly efficient, preferably using a special tray, although useful with an ordinary tray, is particularly symmetrical in design and useful where there is ample space to accommodate it while in use, such as in relatively large evaporators or in frozen food compartments of mechanically cooled refrigerators.

In use of the various forms of freezers herein disclosed, the assembly of tray and detachable unit, with the desired ingredients in the chamber of the tray, is placed in the evaporator of a mechanical refrigerator or frozen food cabinet and preferably bonded to the evaporator by wiping a moist cloth along the bottom of the tray just prior to placing the freezer in the evaporator compartment. The motor is then set in action, such as by closing the electric circuit of an electric motor, and it in turn operates the agitating means at a suitable speed, through the motion transmitting means, until latent heat is removed, or nearly so, from the ingredients previously placed in the tray. When the ingredients become frozen to the proper consistency, the motor may be stopped by manual attention. However I have found that by using a shaded pole induction type electric motor, the motor may be permitted to stall when the ingredients become frozen, and that the motor may remain in stalled condition, fully energized, for long periods without being damaged.

It will be noted from the foregoing and an inspection of Figs. 3, 4 and 9 that since the agitating means 36 and 37 have detachable and interchangeable connection with the couplings 48, a person prior to using the apparatus may selectively couple the agitating means with the motion transmitting means so as to produce the desired characteristic of the dessert, that is, either firm or fluffy. As an example, the motion transmitting means shown in Fig. 2 is such that the coupling 48 at the left side of Figs. 4 and 9 rotates in a predetermined direction, such as counter-clockwise, and the coupling 48 at the right side of Figs. 4 and 9 rotates in a predetermined direction, such as clockwise so that if the agitating means 36 is operatively connected to the coupling 38 that rotates counter-clockwise and the agitating means 37 is operatively connected to the coupling 38 that rotates clockwise, as shown in Fig. 4, a firm dessert or one with less over-run will be produced by operation of the apparatus than if there is an interchange of the agitating means 36 and 37 with respect to the couplings, as shown in Fig. 9, where in operation of the apparatus a fluffy dessert or one with considerable overrun will be produced.

By the terms "closely spaced" and "sweeping" in setting forth the relationship between the lower and free margins 44 and 45 of the wings 38 and 39 with respect to the bottom and walls of the tray, reference is had to such spacing that the bottom and walls are substantially swept free of congealed fluid while minimizing a building up of frozen dessert on the bottom and walls of the tray before the entire mix has reached a frozen consistency. In practice it has been found that this spacing should not exceed one-sixteenth on an inch between the wing and the tray bottom, because of the close proximity of the tray bottom to the freezing medium in the mechanical refrigerator evaporator. The spacing between the margin 45 and the wall of the tray may be greater than one-sixteenth of an inch consistent with the purpose in having this sweeping relationship in contradistinction to wide spacing which results in a crystallized frozen crust along the inside of the tray wall. In this manner the present invention differs from the relationship between the agitating means in churns for making butter where the purpose is to separate the butter fat from the milk and where it is desirable that there be ample zones for the lighter material to flow to the top and the heavier material settle on the bottom of the container.

In use of the various forms of freezers herein disclosed, the assembly of tray and detachable unit, with the desired ingredients in the chamber of the tray, is placed in the evaporator of a mechanical refrigerator or frozen food cabinet and preferably bonded to the evaporator by wiping a moist cloth along the bottom of the tray just prior to placing the freezer in the evaporator compartment. The motor is then set in action, such as by closing the electric circuit of an electric motor, and it in turn operates the agitating means at a suitable speed, through the motion transmitting means, until latent heat is removed, or nearly so, from the ingredients previously placed in the tray. When the ingredients become frozen to the proper consistency, the motor may be stopped by manual attention. However I have found that by using a shaded pole induction type electric motor, the motor may be permitted to stall when the ingredients become frozen and that the motor may remain in stalled condition, fully energized, for long periods without being damaged.

What is claimed is:

1. In a freezer of the character described, the combination on an elongated tray provided with an upwardly opening chamber, an elongated, relatively flat lid body provided with a major portion overlying and closing said chamber, and a minor portion extending above and beyond one end of said tray, said minor portion provided with an opening, rotatable agitators disposed in said chamber and carried by said lid body, a motor including an upwardly projecting drive shaft and a housing for the motor detachably connected to said lid body beneath said minor portion thereof and with said drive shaft extending through and above said opening therein, and motion transmitting means carried by said lid body, disposed mainly above the upper face thereof, and operatively and detachably connected with said motor and agitators for imparting motion of the former to the latter, said motion transmitting means including a train of engaging wheels one of which is spring biased in frictional engagement with said drive shaft.

2. In a freezer of the character described, the combination of an elongated tray provided with an upwardly opening chamber, at least two agitators in said chamber revoluble about vertical axes in spaced apart relation longitudinally of the tray, said agitators each comprising a plurality of laterally extending wings, at least one wing of one of the agitators cambered in a direction to spoon fluid in the tray chamber downwardly when the agitator is rotated in a predetermined direction and to spoon the fluid upwardly when the agitator is rotated in a reverse direction, and at least one wing of another of said agitators cambered in a direction to spoon fluid in the tray upwardly when the agitator is rotated in said predetermined direction and to spoon the fluid downwardly when the agitator is rotated in a reverse direction, a motor, and motion transmitting means operatively connecting said motor with said agitators, said motion transmitting means including couplings with which said agitators have detachable and interchangeable connection, said couplings being rotatable in counter directions by said motion transmitting means whereby said agitators may be selectively engaged with said couplings to either spoon the fluid upwardly or downwardly in the chamber of the tray, upon rotation of said couplings in counter directions.

References Cited in the file of this patent

UNITED STATES PATENTS

| | | |
|---|---|---|
| 149,072 | Sands | Mar. 31, 1874 |
| 348,639 | Riley | Sept. 7, 1886 |
| 526,596 | Weston | Sept. 25, 1894 |
| 792,461 | Sahm | June 13, 1905 |
| 826,839 | Fay | July 24, 1906 |
| 1,224,798 | Saxe | May 1, 1917 |
| 1,292,141 | Swigert | Jan. 21, 1919 |
| 1,528,526 | Buckley | Mar. 3, 1925 |
| 1,760,654 | Maxwell | May 27, 1930 |
| 1,841,434 | Gibson | Jan. 19, 1932 |
| 1,873,407 | Holland | Aug. 23, 1932 |
| 1,885,139 | Porter | Nov. 1, 1932 |
| 1,922,784 | Sheriff et al. | Aug. 15, 1933 |
| 1,981,008 | Torson | Nov. 20, 1934 |
| 2,059,604 | Phelan et al. | Nov. 3, 1936 |
| 2,071,410 | Kuhn et al. | Feb. 23, 1937 |